(12) United States Patent
Sircar

(10) Patent No.: US 6,794,322 B2
(45) Date of Patent: Sep. 21, 2004

(54) LOW-BORON GLASS FIBERS AND GLASS COMPOSITIONS FOR MAKING THE SAME

(75) Inventor: Anup Sircar, Corvallis, OR (US)

(73) Assignee: Evanite Fiber Corporation, Corvallis, OR (US)

( * ) Notice: Subject to any disclaimer, the term of this patent is extended or adjusted under 35 U.S.C. 154(b) by 237 days.

(21) Appl. No.: 10/010,531

(22) Filed: Dec. 5, 2001

(65) Prior Publication Data

US 2002/0077243 A1 Jun. 20, 2002

(Under 37 CFR 1.47)

Related U.S. Application Data

(62) Division of application No. 09/533,385, filed on Mar. 22, 2000, now Pat. No. 6,358,871.
(60) Provisional application No. 60/125,796, filed on Mar. 23, 1999.

(51) Int. Cl.$^7$ .......................... C03C 3/112; C03C 13/06
(52) U.S. Cl. .......................... 501/57; 501/59; 501/69; 501/70; 501/35; 501/36
(58) Field of Search .......................... 501/35, 36, 57, 501/59, 69, 70

(56) References Cited

U.S. PATENT DOCUMENTS

| | | |
|---|---|---|
| 2,908,036 A | 10/1959 | Russell |
| 3,013,888 A | 12/1961 | de Lajarte |
| 3,081,179 A | 3/1963 | Charvat et al. |
| 3,847,626 A | 11/1974 | Erickson et al. |
| 3,847,627 A | 11/1974 | Erickson et al. |
| 3,853,569 A | 12/1974 | Laurent et al. |
| 3,876,481 A | 4/1975 | Erickson et al. |
| 3,945,838 A | 3/1976 | Erickson et al. |
| 4,026,715 A | 5/1977 | Erickson et al. |
| 4,102,692 A | 7/1978 | Schartau et al. |
| 4,199,364 A | 4/1980 | Neely |
| 4,203,746 A | 5/1980 | Battigelli et al. |
| 4,203,774 A | 5/1980 | Battigelli et al. |
| 4,243,421 A | 1/1981 | Kume |
| 4,396,722 A | 8/1983 | Rapp |
| 4,402,767 A | 9/1983 | Hinze et al. |
| 4,542,106 A | 9/1985 | Sproull |
| 4,615,988 A | 10/1986 | Le Moigne et al. |
| 4,756,732 A | 7/1988 | Barthe et al. |
| 4,771,019 A | 9/1988 | Sproull |
| 5,284,807 A | 2/1994 | Komori et al. |
| 5,407,872 A | 4/1995 | Komori et al. |
| 5,495,859 A | 3/1996 | Bowen et al. |
| 5,497,791 A | 3/1996 | Bowen et al. |
| 5,501,234 A | 3/1996 | Hyre |
| 5,523,265 A | 6/1996 | Rapp et al. |
| 5,576,252 A | 11/1996 | Rapp et al. |
| 5,598,853 A | 2/1997 | Hyre |
| 6,277,777 B1 | 8/2001 | Xu et al. |

FOREIGN PATENT DOCUMENTS

| | | |
|---|---|---|
| DE | 19530030 | 2/1997 |
| EP | 516 354 A1 | 12/1992 |
| JP | 11-29344 | 2/1999 |
| SU | 1470694 | 4/1989 |

OTHER PUBLICATIONS

Binzer, Jürgen, "New Technically Boron–Free Hepa Filter Materials".

Sircar, Anup, "An Introduction to Glass and Glass Fiber Manufacturing Technology with Application to Nonwoven Process," *Tappi Journal*, vol. 4, No. 4, pp. 167–175, Apr. 1993.

*Primary Examiner*—Karl Group
(74) *Attorney, Agent, or Firm*—Klarquist Sparkman, LLP

(57) ABSTRACT

Low-boron, high-barium glass compositions and fine-diameter glass fibers for forming clean room HEPA and ULPA filters, are provided. The compositions and resulting glass fibers preferably comprise a low concentration, less than about 1 weight percent, of boric oxide, a relatively high concentration of barium, such as from about 5.5 to about 18 weight percent barium oxide, and a concentration of alkali oxide ranging from about 10 to about 14.5 weight percent. Alumina is preferably present in the glass fiber compositions and the resulting glass fibers in a range of from about 4 weight percent to about 8 weight percent, and calcium oxide and magnesium oxide are preferably present in a range of from about 1 weight percent to about 6 weight percent and from about 0 weight percent to about 3.5 weight percent, respectively. The glass fiber compositions also preferably include from about 2 to about 6 weight percent zinc oxide, from about 0.1 to about 1.5 weight percent fluorine, and very low concentrations of manganese oxide, ferric oxide and various impurities such as strontium oxide, lithium oxide, titanium oxide, and zirconium oxide. Preferably, the balance of the composition is silicon dioxide.

10 Claims, No Drawings

LOW-BORON GLASS FIBERS AND GLASS COMPOSITIONS FOR MAKING THE SAME

This is a division of U.S. Patent Application No. 09/533,385, filed Mar. 22, 2000, now U.S. Pat. No. 6,358,871, which issued on Mar. 19, 2002 and claims benefit under 35 U.S.C. §119(e) of Provisional Application No. 60/125,796, filed Mar. 23, 1999.

FIELD OF THE INVENTION

The present invention concerns fine-diameter glass fiber for use in making filters such as HEPA and UPLA filters and low-boron, high-barium glass compositions for making the same.

BACKGROUND OF THE INVENTION

The glass fibers used in high-efficiency particulate air ("HEPA") filtration media and ultra-low penetration air ("ULPA") filtration media typically contain significant amounts of boron, e.g., from about 8 to 11 weight percent of boric oxide. The compositions of some typical glass fibers used in HEPA filters are listed in Table A. The most common method for manufacturing fine-diameter glass fibers, like those of Table A, is "flame attenuation." Flame attenuation involves subjecting strands of glass filaments to high-velocity gaseous blasts from a combustion burner. Another typical method, known as the rotary or CAT process, utilizes centrifugal or rotary forces where the hot molten glass is forced through small orifices in the outer wall of a metal, rotary spinner.

TABLE A

|  | Conventional Air Filter Glass Composition A (Typical) Wt. % | Conventional Air Filter Glass Composition B (Typical) Wt. % | Conventional Air Filter Glass Composition C (Typical) Wt. % |
|---|---|---|---|
| Chemical Constituent |  |  |  |
| $Al_2O_3$ | 5.8 | 5.7 | 6.0 |
| $Na_2O$ | 8.5 | 10.0 | 9.0 |
| $K_2O$ | 3.0 | 3.0 | 2.5 |
| CaO | 3.0 | 1.7 | 3.0 |
| MgO | 0.95 | 0.31 | 1.1 |
| BaO | 3.0 | 5.0 | 4.8 |
| ZnO | 2.0 | 4.0 | 5.2 |
| $F_2$ | 0.75 | .6 | 0.06 |
| $B_2O_3$ | 8.9 | 10.7 | 9.0 |
| $SiO_2$ | By Difference | By Difference | By Difference |
| Fiber Properties |  |  |  |
| Fiber Diameter | $0.71\mu$ | $0.81\mu$ | $0.73\mu$ |
| Hand Sheet Properties |  |  |  |
| Air Resistance | 35.87 | 29.12 | 32.89 |
| Tensile lb/in | 8.24 | 8.02 | 5.24 |
| Elongation | 1.66 | 2.10 | 2.05 |
| Crease Tensile | 3.15 | 2.36 | 2.74 |
| Crease Elongation | 0.24 | 0.43 | 0.78 |
| Loss in Elongation |  |  |  |
| In Humidity | 22–25.0 | 24.0 | 1.2 |

Conventional HEPA and ULPA glass fiber filters, utilizing compositions like those listed in Table A, contain glass microfibers with diameters from about 0.1 µm to about 3.0 µm. Boric oxide is included in the typical glass composition because it results in glass compositions having relatively low viscosity/temperature relationships. The low viscosity/temperature relationships allow the glass composition to pass easily through the orifices in the walls of the spinners so that relatively fine-diameter fibers are produced. The presence of boric acid also reduces corrosion and erosion of the spinner metal. Furthermore, boric acid helps to prevent deterioration or degradation of the glass fiber in aqueous or highly humid environments.

Recent demands for HEPA and ULPA filters used in "clean room" environments for pharmaceutical, biomedical, semiconductor, and related applications, however, require the filters be substantially free of boron. Conventional HEPA and ULPA filters, like those listed in Table A, contain levels of boron that typically cause unacceptable air contamination with boron and thus are not suitable for clean room use. For example, during typical hydrofluoric (HF) acid etch processing of a micro-electronic wafer chip, the HF can combine with boron from the HEPA glass fiber filter to produce boron hexafluoride. The presence of boron hexafluoride has been found to be detrimental to production of high-density memory integrated circuits. Consequently, there is a need in the semi-conductor industry for HEPA filters free of boron but having viscosities that allow fine fiber production via conventional fiber manufacturing methods. That is, the glass composition for making such fibers must be capable of being drawn into fine diameter fibers by flame attenuation, rotary spinning, and CAT processes and must provide a filter that is resistant to deterioration even in high-humidity environments.

SUMMARY OF THE INVENTION

Low-boron, high-barium glass compositions and resultant fine-diameter glass fibers used to form HEPA and ULPA glass fiber filters for clean room use, are provided. The compositions and resulting glass fibers preferably comprise a low boric oxide ($B_2O_3$) concentration, i.e., less than about 1 weight percent, a relatively high concentration of barium, such as from about 5.5 to about 18 weight percent barium oxide (BaO), and a concentration of alkali ranging from about 10 to about 14.5 weight percent. Alumina ($Al_2O_3$) is preferably present in the glass compositions and the resulting glass fibers in a range of from about 4 weight percent to about 8 weight percent. Additionally, calcium oxide (CaO) and magnesium oxide (MgO), are preferably present in the glass compositions and resulting glass fibers of the present invention in the range of from about 1 weight percent to about 6 weight percent and from about 0 weight percent to about 3.5 weight percent, respectively. The glass fiber compositions of the present invention also include from about 2.0 to about 6.0 weight percent zinc oxide (ZnO), preferably between 2.0 and 5.0 weight percent, from about 0.1 to about 1.5 weight percent $F_2$, preferably between 0.1 to 1.0 weight percent, and very low concentrations of manganese oxide (MnO), ferric oxide ($Fe_2O_3$) and possibly various impurities such as strontium oxide (SrO), lithium oxide ($Li_2O$), titanium oxide ($TiO_2$), and zirconium oxide ($ZrO_2$). Preferably, the balance of the composition is silicon dioxide ($SiO_2$). These combinations of components yield the glass compositions of the present invention. Further, the glass compositions of the present invention have suitable viscosities for production of fine-diameter glass fibers using conventional methods, e.g., flame attenuation, rotary spinning, and CAT processes. The glass fibers of the present invention have superior humidity resistance. Accordingly, the glass fibers produced from the compositions of the present invention are well suited for forming HEPA and ULPA glass fiber filters for use in clean room environments.

DISCLOSURE OF THE INVENTION

The present invention relates to glass compositions having relatively low-boron concentrations and relatively high-barium concentrations. The glass compositions are used to produce the fine-diameter glass fibers of the present invention (as shown in Table B, below). The fine-diameter fibers preferably have an average diameter of about 0.1 μm to about 8.15 μm, or more preferably, have an average diameter of about 0.2 μm to about 3.0 μm. The low-boron, high barium content glass compositions of the present invention are capable of being drawn into the fine-diameter fibers of the present invention by, e.g., conventional flame attenuation, rotary spinning, and CAT processes. The glass compositions of the present invention have relatively low-boron concentrations and therefore avoid the boron contamination problems associated with typical boron concentrations in prior art glass fiber filters. In addition, the resultant low-boron, high-barium content glass fibers of the present invention have the desired physical and mechanical properties to impart sufficient humidity resistance for use as HEPA and ULPA glass fiber filter media particularly suitable for use in micro-electronic clean room environments.

TABLE B

GLASS FIBER COMPOSITIONS OF THE PRESENT INVENTION

| Constituent | Weight % Range | Preferred Weight % Range |
|---|---|---|
| $SiO_2$ | 57 to 67 | 59 to 65 |
| $Al_2O_3$ | 4 to 8 | 5 to 6 |
| $Na_2O$ | 7 to 12 | 7 to 10 |
| $K_2O$ | 2 to 7.5 | 2 to 6 |
| CaO | 1 to 6 | 1 to 6 |
| MgO | 0 to 3.5 | 0 to 3.5 |
| BaO | 5.5 to 18 | 6 to 16 |
| ZnO | 2 to 6 | 2 to 5 |
| $Fe_2O_3$ | <0.2 | <0.1 |
| $B_2O_3$ | 0 to <1 | <0.1 |
| $F_2$ | 0.1 to 1.5 | 0.1 to 1.0 |
| $SO_3$ | 0 to 0.6 | 0 to 0.6 |
| $SiO_2 + Al_2O_3$ | 61.0 to 72.0 | 64 to 70 |
| $R_2O$[1] | 10 to 14.5 | 10 to 12.5 |
| CaO + MgO | 1 to 9 | 1 to 9 |

TABLE B-continued

GLASS FIBER COMPOSITIONS OF THE PRESENT INVENTION

| Constituent | Weight % Range | Preferred Weight % Range |
|---|---|---|
| CaO + MgO + BaO | 5 to 27 | 10 to 20 |
| MnO | ND | ND |

[1] $R_2O = Na_2O + K_2O$

As discussed above, glass compositions having boron removed completely or reduced considerably will suffer from increased viscosity and liquidus temperatures making processing into fine-diameter fibers by conventional methods unworkable. Not only do such compositions make it virtually impossible to process the glass into fine fibers, but there is also a drastic reduction in aqueous durability and humidity resistance of the resulting glass fibers. The glass compositions of the present invention overcome these deficiencies, in part, due to a relatively high concentration of barium oxide in combination with the other glass composition constituents (see Tables B and C; Table C compares specific glass fibers of the present invention with conventional low-boron glass fibers). The relatively substantial concentration of barium in combination with the low-boron concentration in the present glass compositions decreases both the high-temperature glass viscosity and liquidus temperatures of the compositions. Accordingly, the glass compositions may be efficiently processed into the fine-diameter glass fibers of the present invention using conventional processes. Further, the durability of the present invention glass fibers made from the disclosed glass compositions, as shown, e.g., by the fibers humidity resistance, are satisfactory for forming HEPA and ULPA filters employed in clean room applications.

Accordingly, the barium content of the glass compositions (and resulting glass fibers) of the present invention is preferably from about 5.5 weight percent to about 18 weight percent barium oxide. At about 5.2 or less weight percent barium oxide, there is typically an insufficient corresponding glass fiber durability when combined with the other glass fiber composition constituents in the percent ranges disclosed herein.

TABLE C

LOW-BORON, HIGH-BARIUM CONTENT GLASS FIBER COMPOSITION

| Glass Compositions and Glass Fiber Components | Low-Boron Glass Fiber Composition (G) Typical Wt. % | Low-Boron Glass Fiber Composition (H) Typical Wt. % | Low-Boron Glass Fiber Composition (J) Typical Wt. % | Conventional Low-Boron Glass Fiber Composition Typical Wt. % | Conventional Low-Boron Glass Fiber Composition Typical Wt. % |
|---|---|---|---|---|---|
| $Al_2O_3$ | 5.5 | 5.5 | 5.5 | 1.5 | 3.21 |
| $Na_2O$ | 11.5 | 9.2 | 8.4 | 11.6 | 11.08 |
| $K_2O$ | 4.0 | 3.0 | 3.0 | 4.0 | 4.9 |
| CaO | 4.0 | 5.8 | 5.1 | 4.0 | 6.2 |
| MgO | 1 to 1.5 | 2.8 | 2.3 | 1.4 | 3.1 |
| BaO | 5.0 | 9.0 | 9.5 | 0.06 | 0.03 |
| ZnO | 4.0 | 3.0 | 3.0 | 0 | 0.7 |
| $F_2$ | 0.5 | 0.5 | 0.7 | 0 | 0 |
| $Fe_2O_3$ | less than 0.1 | Less than 0.1 | 0.1 Max | 0.037 | 0.045 |
| $B_2O_3$ | <0.03 Max | 0.01 Max | <0.01 Max | 0.01 | 0.01 |
| $SiO_2$ | By Difference | By Difference | By Difference | 73.5 | |
| About 0.7 μm Diameter Fiber | | | | | |
| Basic weight | 132.9 | 134.2 | 132 | | 130.0 |
| Air Resistance | 39.2 | 38.9 | 30.5 | 35.2 | 21.8 |
| Tensile Strength lb/in | 6.9 | 8.21 | 7.59 | 6.0 | 2.9 |
| Elongation | 1.24 | 1.61 | N/A | .81 | 2.61 |

TABLE C-continued

LOW-BORON, HIGH-BARIUM CONTENT GLASS FIBER COMPOSITION

| Glass Compositions and Glass Fiber Components | Low-Boron Glass Fiber Composition (G) Typical Wt. % | Low-Boron Glass Fiber Composition (H) Typical Wt. % | Low-Boron Glass Fiber Composition (J) Typical Wt. % | Conventional Low-Boron Glass Fiber Composition Typical Wt. % | Conventional Low-Boron Glass Fiber Composition Typical Wt. % |
|---|---|---|---|---|---|
| Crease Tensile | 3.48 | 4.28 | 2.70 | 1.35 | 1.04 |
| Crease Elongation | 0.85 | 0.88 | 0.39 | 0.53 | 0.5 |
| Loss in Elongation in Humidity at 60° C. | 72.0 | 54.8 | 27.5 | Too weak to test | 82.3 |
| About 0.5 μm Diameter Fiber | | | | N/A | N/A |
| Basic weight | 132.9 | 134.2 | 132.0 | | |
| Air Resistance | 47.1 | 61.26 | 43.9 | | |
| Tensile Strength lb/in | 4.41 | 5.95 | 6.3 | | |
| Elongation | 1.96 | 1.61 | 1.79 | | |
| Crease Tensile | | | | | |
| Crease Elongation | | | | | |
| Loss in Elongation in Humidity at 60° C. | 81.9 | 44.5 | 21.0 | | |
| About 0.3 μm Diameter Fiber | | | | N/A | N/A |
| Basic weight | 132 | 133.9 | 132 | | |
| Air Resistance | 64.2 | 66.7 | 52.5 | | |
| Tensile Strength lb/in | 4.7 | 5.95 | 5.28 | | |
| Elongation | 1.73 | 4.81 | 1.47 | | |
| Crease Tensile | | | | | |
| Crease Elongation | | | | | |
| Loss in Elongation in Humidity at 60° C. | | 76.5 | 39.0 | | |
| Glass Properties | | | | | |
| Temp at Log 3° F. | N/A | 2239 | 2214 | N/A | N/A |
| Liquidus Temp ° F. | N/A | 1773 | 1733 | N/A | N/A |
| T Log 3 - TL ° F. | N/A | 466 | 481 | N/A | N/A |

The resistance of the present invention glass fibers, as shown in Tables B and C, is also the result of relatively low total alkali content. For example, the alkali content of glass compositions and resulting fibers of the present invention include sodium oxide ($Na_2O$) at about 7 to about 12 weight percent, potassium oxide ($K_2O$) at about 2 to about 8 weight percent and $R_2O$ at about 10 to about 14.5 weight percent. In this formulation, $R_2O$ represents the alkali metal oxide constituents in the composition, which is effectively the sum of the $Na_2O$ and $K_2O$ content.

In general, higher alkali content will have a detrimental effect on the mechanical properties of the fine-diameter glass fibers, particularly those made of alkali-alkaline earth-aluminosicate glasses. This detrimental effect is reflected in a loss of elongation and crease tensile strength of the fiber, particularly in humid conditions. The alkali content of the present invention glass compositions, however, is preferably not so low that the viscosity of the glass compositions increases to a level that causes difficulty in the melting and fiberizing processes. For example, a glass composition comprising a $Na_2O$ concentration of about 11.5 weight percent, a $K_2O$ concentration of about 4.0 weight percent, and, thus a $R_2O$ concentration of about 15.5 weight percent, a ZnO content of about 4 weight percent, and a BaO content of about 5 weight percent, results in fibers having significant loss in elongation in relatively high humidity. Specifically, such an undesirable glass composition produces fibers having a 72% loss in elongation at high humidity for 0.7 μm diameter fibers and 82% loss for 0.5 μm diameter fibers. In contrast, as described above, the glass compositions of the present invention have a lower total alkali content, i.e., $R_2O$ concentrations of from about 10 to about 14.5 weight percent and, preferably, about 12.2 weight percent (e.g., a $Na_2O$ content of about 9.2 weight percent and $K_2O$ content of about 3.0 weight percent).

The glass fibers of the present invention have a much lower loss in elongation in higher humidity environments. For example, as shown in Table C, glass fiber composition H, lost about 55% elongation for the 0.7 μm diameter fibers under humid conditions, but only about 44.5% for the 0.5 μm diameter fibers. A glass composition of the present invention having a $Na_2O$ concentration of about 8.4 weight percent, a $K_2O$ concentration of about 3.0 weight percent, and a total $R_2O$ content of about 11.4 weight percent, results in fibers having a loss of only about 39.0% under humid conditions for the 0.3 μm fibers (Table C, glass composition J).

The present glass compositions preferably further comprise from about 1 to about 9 weight percent alkaline earth oxides, excluding barium oxide (discussed above). In particular, CaO and MgO preferably comprise from about 1 weight percent to about 6 weight percent and about 0 weight percent to about 3.5 weight percent, respectively, of the present invention compositions.

The glass compositions of the present invention further include about 2 weight percent to about 6 weight percent ZnO. A concentration of ZnO in the range of about 2 weight percent to about 5 weight percent is especially preferred in the present glass compositions. ZnO maintains superior weather and humidity resistance of resulting fine-diameter fibers. Too much ZnO in the glass composition above 6.0 weight percent, however, may result in devitrification problems during processing of the glass fibers and may also require effluent water treatment during conversion of the fibers to paper filter media.

The glass fiber compositions of the present invention ideally contain no intentional addition of MnO. Although the addition of MnO may improve the humidity and weather resistance of a glass fiber, it is not a desirable addition for glass fiber compositions that are to be used for making fine-diameter fibers. That is, MnO, a transition metal oxide, typically inflicts strong coloration to glass compositions, affecting the radiation conductivity and, hence, the setting rate and fiberization characteristics of the glass composition. Therefore, MnO is not desired in glass compositions that will be made into relatively fine-diameter microfibers, such as those suited for clean room filter applications.

The present invention glass compositions preferably include total ferric oxide ($Fe_2O_3$) at a relatively low concentration. The presence of $Fe_2O_3$ in the glass compositions typically results from impurities present in raw materials used. The raw materials used for making fine-diameter glass microfibers, however, are typically of a higher quality than those used for making thermal insulation fibers, and hence will contain a lower amount of impurities, such as $Fe_2O_3$. The addition of the transition metal ferric oxide to glass compositions typically imparts strong coloration to the glass compositions (as mentioned above for MnO), negatively impacting the fiberization characteristics of the glass composition. Accordingly, for making fine-diameter glass wool microfibers the total $Fe_2O_3$ content of the glass compositions of the present invention is kept to a minimum, i.e., less than 0.2 weight percent, and more preferably less than 0.1 weight percent.

The glass fiber compositions of the present invention further include fluorine, from about 0.1 to about 1.5 weight percent. Preferably, about 0.1 weight percent to about 1.0 weight percent of fluorine is added to the glass compositions to increase the compositions melting rate. An increased melt rate is reflected in lowered endothermic minimums for fluorine containing glass compositions. For example, addition of 1 weight percent of fluorine to a $Na_2O$, $CaO$, $SiO_2$ glass fiber composition lowers the endothermic minimum of the glass composition to about 580° C. A glass composition not including fluorine typically has an endothermic minimum of about 650° C.

Fluorine also reduces a glass composition's viscosity, aiding the glass refining process by making it easier to eliminate trapped gas seeds or bubbles in the glass composition. This is achieved through reduced surface tension and viscosity of the composition. Substituting about 1 weight percent of silica in the composition of the present invention with fluorine improves the water resistance of the resulting glass fibers. Furthermore, glass compositions containing from about 0.5 weight percent to about 1 weight percent fluorine produce fine-diameter glass fibers with relatively high tensile strength (e.g., see Table C "Fiber Properties"). A comparison of the tensile strength of a conventional glass composition C shown in Table A (i.e., about 5.24 lbs/in) to the tensile strength glass compositions of the present invention that includes fluorine (see, e.g., Composition H shown in Table C, i.e., 8.21 lbs/in) also illustrates this advantage of the glass fiber compositions of the present invention.

The addition of fluorine to such compositions to provide tensile strength must be balanced by the tendency of glass compositions containing too much fluorine to produce fluorine emissions during melting and fiberization. Many countries require that all processes that produce fluorine emissions include appropriate treatment to neutralize the fluorine gasses and render them harmless to the environment. Since pollution control equipment and processes are expensive, fluorine is generally not added to glass compositions used to make coarse-diameter glass fibers for thermal insulation applications where fiber tensile strength is not an important criteria. This contrasts with the importance of tensile strength in making fine-diameter glass fibers as in the present invention.

A fluorine concentration in a glass above about 1.0 weight percent can cause the glass to become opaque or translucent, which is not desirable for fabricating fine-diameter microfibers. The relatively high opacity of the glass is caused by the reaction products of alkali and alkaline earths with the fluorine. This is particularly true for glass compositions containing zinc oxide, calcium oxide, and barium oxide.

Alumina ($Al_2O_3$) content in the glass fiber compositions of the present invention range from about 4 weight percent to about 8 weight percent, and more preferably at a range of from about 5 weight percent to about 6 weight percent. This concentration of $Al_2O_3$ helps to maintain glass fiber durability as the glass is drawn to fine diameters, as well as to provide the desired physical and mechanical properties for the fibers in hot and humid environments. The present glass compositions additionally, preferably include $SiO_2$ at a concentration of from about 59 weight percent to about 67 weight percent and more preferably from about 59 to about 65 weight percent $SiO_2$.

Various other constituents for improving the glass compositions and/or resulting glass fibers' properties may be present in the glass fiber compositions provided herein. Some constituents may also be present as impurities without adversely affecting the glass compositions or the resultant glass fibers, e.g., SrO, $Li_2O$, $TiO_2$, $ZrO_2$ and the like (typically present in concentrations of from about 0 weight percent to about 3.0 weight percent). Preferably, such impurities are not present in concentrations greater than about 2.0 weight percent, as the presence of such impurities may alter the positive effects of other constituents in the glass fiber compositions of the present invention. In particular, a high $ZrO_2$ concentration limits the range of alumina concentrations that may be present in the glass compositions of the present invention without causing devitrification. Furthermore, high $ZrO_2$ concentrations may also require extremely low CaO and MgO concentrations, again to avoid the devitrification problem. This is just one example of how the presence of one composition impurity may negatively impact several aspects of the present invention glass fiber compositions.

The glass compositions of the present invention are preferably drawn into fine-diameter fibers (i.e., about 0.1 $\mu$m to about 8.15 $\mu$m) by flame attenuation, rotary spinning or CAT processes. Typically, the glass compositions of the present invention used to make glass fibers by such processes have viscosities of about Log n=3.0 at a temperature of about 2200° F. (1204° C.) or less, and preferably have liquidus temperature of at least about 250° F. below the Log 3 temperature.

In general, it is desirable for glass compositions developed for fiberization to have the right viscosity-temperature relationship, as discussed extensively above. Further, the glass compositions preferably have the ability to be processed into fibers without forming crystals or undergoing devitrification. Crystallization or devitirification can be avoided by maintaining the temperature of the glass during the fiberization process well above the glass' liquidus temperature. For most processes, the temperature of the glass at the beginning of the fiberization process is the temperature that achieves a molten velocity of about Log 3. Therefore, when producing glass fibers, it is desirable to have a glass formulation having a liquidus temperature well below the temperature needed to achieve Log 3 viscosity, otherwise crystallization or devitrification might occur in the hot glass. The glass physical properties measurements reported in Table C indicate that the different low-boron, barium-oxide containing glasses of the present invention have differences of over 450° F. between the glass temperature at Log 3 and the glass liquidus temperature. These formulations thereby avoid crystallization problems during fiberization.

Both the temperature-viscosity relationship and the viscosity-liquidus relationship affect the ability of a glass formulation to be fiberized using a rotary wool fiberizing process. The rotary process is performed using a device similar to a cotton candy machine. This process for making glass wool was originally developed in 1954 by Saint Gobain in France. Molten glass stream flows by a free-fall drop into a hollow, rotating cylinder, known as the "spinner." It has many holes in its vertical sidewall edge. Centrifugal force of the rotating spinner forces the molten glass to extrude laterally out of the numerous perforations as large diameter strands. High-velocity, hot, gas-air jet flames are produced from burners located peripherally around the spinner, further attenuating the large diameter fibers into fine, elongated fibers. The fibers are collected onto a metal conveyor belt, under slight vacuum.

In the rotary wool process, a molten glass stream, at a viscosity of about log 3 or $10^3$ poise, is fed into the rotating spinner. The glass comes of the spinner as strands through perforations in the spinner sidewall. The process lowers the molten glass temperature in the spinner, but permits glass fiberization without crystallization problems if there is a sufficient temperature difference (as discussed above) between the temperature required for a viscosity of about log 3 or $10^3$ poise and a liquidus temperature of the glass. Generally, a temperature difference of about 200° F. is the minimum difference that produces satisfactory fibers using the rotary process.

A second process for fiberization of glass compositions is the flame-attenuated wool-fiber process. In this process, marbles, pellets or chunks of glass are remelted in a metal container. In the United States, there are typically two manners in which glass in the flame-attenuated wool process are heated: a process developed by Owens Corning and a process developed by Johns Manville. Both processes are known to those persons skilled in the art.

Owens Corning Fiberglass Corporation of Ohio developed the flame-attenuated wool fiberizing process, known as "Aerocor," using a burner blower. Glass marbles or pellets are melted in an electrically heated metal (such as platinum alloy or other suitable high-temperature, metal base alloys), rectangular, trough shaped container called a "bushing." The container includes multiple holes drilled in the bottom. Most of these bushings are long, e.g. about 10 to about 24 inches in length, narrow in width (about 6") and quite shallow in depth to a rectangular trough. There is a curved, perforated metal plate on top, which acts primarily as a main heating element for remelting cold glass marbles or to temperature condition molten glass from the forehearth. This process is adaptable to provide a molten glass supply directly from the forehearth (temperature conditioning zone) of a glass furnace or to remelt glass marbles/pellets, glass chunks, etc. Multiple primary glass filaments are drawn from the base of the multi-holed bottom plate of the bushing. The coarse filaments are passed through rubber pull rolls and fiber guides into a high velocity, gas-air flame. The coarse filaments melt and are then attenuated (stretched, thinned & elongated) by high kinetic energy of a jet flame blast from an internal combustion gas burner. The fibers are elongated to form fine-diameter, long glass fibers. By controlling the coarse fiber diameter, the speed of the pull rolls, and the temperature and velocity of the gas-air jet stream, it is possible to obtain a consistent average fiber diameter of the glass fibers.

In the flame-attenuated glass process using the direct, electrically heated, metal bushing design of Owens-Corning, there is less temperature gradient in the melting system even when melting cold glass marbles. In this type of glass melting and fiberizing system, the temperature gradients between different locations are not high. When operating this system with a 250° F. temperature difference between the fiberizing temperature and the glass liquidus temperature, there is no problem with fiberization. That is, crystallization does not occur in the glass melt since there are no locations in the system where the melt temperature gets low enough to be close to the liquidus temperature of the glass.

The Johns Manville flame-attenuated glass fiberization process utilizes a tall, metal cylinder, called a glass melting "pot." The main body of the pot is made of a high melting point base metal such as nickel, a nickel-chromium base alloy, a nickel base alloy, a cobalt-nickel base alloy, stainless steel or the like. The pot is heated from the outside by secondary, spiral electric heating coils or by gas. Cold glass marbles are fed from the top of the metal pot and molten glass is extruded from multiple orifices or tips located in the bottom of the pot as coarse, primary fibers or rods about 0.38 cm in diameter.

The design of Manville's system, with cold glass marbles added continuously or incrementally from the top of the pot, and being heated from an outside source, results in considerable temperature gradients within the pot and in numerous locations, as the glass temperatures are low. If performed using a glass fiberizing temperature that is less than about 350° F. above the liquidus temperature of the glass, there is a possibility that crystallization will become a problem. This may be particularly true when there is an increase in the amount of cold marbles introduced to the top of the pot. Accordingly, a glass formulation that will have a large difference between its liquidus temperature and the temperature needed to have a viscosity of Log 3, such as those of the present invention, work well in such a fiberizing system.

For high-viscosity, low-alkali containing glass compositions of the present invention having "Log 3" viscosities at temperatures of about 2100° F. or higher, to increase the life of spinners used in processing the present invention glass fibers, it is preferable that the spinner be formed of special high-temperature alloys. For example, see U.S. Pat. No. 4,203,746.

Alternatively, see U.S. Pat. No. 4,402, 767 for a ceramic oxide dispersion strengthened alloy spinner.

Typically fine-diameter glass fibers of the present invention used to make air filtration media have diameters of from about 0.1 $\mu$m to about 3.0 $\mu$m. Coarse-diameter fibers, however, (i.e., fibers having diameters of from about 5.5 $\mu$m to about 8.5 $\mu$m) may also be made using the glass fiber compositions disclosed herein. Such coarse-diameter glass fibers are typically used for filtration media reinforcement or as filler for such filtration media. The resultant fine-diameter glass fibers of the present invention (and coarse-diameter glass fibers) have the desired durability and weather resistance in addition to possessing the physical and mechanical properties necessary for conversion to HEPA and ULPA glass fiber filter media.

Glass fibers of the present invention (made from particular glass compositions of the present invention) were made into hand sheet papers using 100% of each grade of glass fibers. The properties of the glass fiber hand sheets were measured by procedures that are the same as or similar to those suggested by the Technical Association of the Pulp and Paper Industry (TAPPI). The basis weight, caliper, and tensile strength were also measured, as shown in Table C. For evaluating the performance of the present invention glass fibers in high-humidity environments, the respective hand sheets were subjected to relatively high-humidity environments of over about 80% humidity (up to about 90% humidity) at about 60° C. The water resistance of the glass fibers of the present invention at relatively high-temperatures were also measured by measuring the loss in physical and mechanical properties of the respective hand sheets in relatively high-humidity environments at about 60° C. See, for example, Binzer et al., *New Technical Boron-Free HEPA Filter Materials*, Filtration '97 INDA International Conference & Exposition (December 1997), incorporated herein by reference.

Whereas the invention has been described with reference to multiple embodiments, it will be understood that the invention is not limited to those embodiments. On the contrary, the invention is intended to encompass all modifications, alternatives, and equivalents as may be included within the spirit and scope of the invention as defined by the appended claims. For example, the glass fibers of the present invention may be used to form other types of filters and may be used in applications other than clean room environments.

I claim:

1. A low-boron, high-barium concentration glass fiber composition comprising:

less than about 1 weight percent boron;

from about 5.5 to about 18 weight percent barium oxide;

from about 10 to about 14.5 weight percent alkali metal oxide;

from about 4 to about 8 weight percent alumina;

from about 1 to about 9 weight percent alkaline earth oxide, excluding barium oxide;

from about 2 to about 6 weight percent zinc oxide;

from about 0.1 to about 1.5 weight percent fluorine; and a balance of the glass fiber composition being silica.

2. The glass fiber composition of claim 1, wherein the boron is present as $B_2O_3$, alkali metal oxide is present as $Na_2O$ or $K_2O$, and alkaline earth oxide is present as GaO or MgO.

3. The glass fiber composition of claim 1, wherein the alkali oxide is present as $Na_2O$ and $K_2O$ and alkaline earth oxide is present as CaO and MgO.

4. The glass fiber composition of claim 1, further comprising less than about 0.2 weight percent of one or more compounds selected from the group consisting of MnO, SrO, $Li_2O$, $TiO_2$, $ZrO_2$ and $Fe_2O_3$.

5. A low-boron, high-barium glass fiber composition comprising:

less than about 1 weight percent of boric oxide;

from about 6 to about 16 weight percent barium oxide;

from about 10 to about 12.5 weight percent of alkali metal oxide;

from about 5 to about 6 weight percent of alumina oxide;

from about 1 to about 9 weight percent alkaline earth oxide, excluding barium oxide;

from about 2 to about 5 weight percent zinc oxide;

from about 0.1 to about 1.0 weight percent fluorine; and a balance of the composition being silica.

6. The glass fiber composition of claim 5, wherein the glass fiber composition forms glass fibers having an average diameter of from about 0.1 μm to about 3.0 μm.

7. The glass fiber composition of claim 5, wherein boron is present as $B_2O_3$, alkali metal oxide is present as $Na_2O$ and $K_2O$, and alkaline earth oxide is present as CaO and MgO.

8. The glass fiber composition of claim 5, further comprising less than about 0.2 weight percent of one or more compounds selected from the group consisting of MnO, SrO, $Li_2O$, $TiO_2$, $ZrO_2$, and $Fe_2O_3$.

9. A low-boron, high-barium glass fiber composition comprising:

less than about 1 weight percent of boron;

from about 6 to about 16 weight percent barium oxide;

from about 10 to about 12.5 weight percent of alkali metal oxide;

from about 5 to about 6 weight percent of alumina oxide;

from about 1 to about 9 weight percent alkaline earth oxide, excluding barium oxide;

from about 2 to about 5 weight percent zinc oxide;

from about 0.1 to about 1.0 weight percent fluorine;

a balance of the composition being silica; and wherein the glass fiber composition forms glass fibers having an average diameter of from about 0.1 μm to about 8.15 μm.

10. The glass fiber composition of claim 9, wherein the glass fibers have an average diameter of from about 0.1 μm to about 3.0 μm.

* * * * *

UNITED STATES PATENT AND TRADEMARK OFFICE
CERTIFICATE OF CORRECTION

PATENT NO.         : 6,794,322 B2                                                                Page 1 of 1
APPLICATION NO.  : 10/010531
DATED              : September 21, 2004
INVENTOR(S)        : Anup Sircar It is certified that error appears in the above-identified patent and that said Letters Patent is hereby corrected as shown below:

In the Claims:
Column 11, line 43, "present as GaO or" should read --present as CaO or--.

Signed and Sealed this

Twenty-fifth Day of May, 2010

David J. Kappos
*Director of the United States Patent and Trademark Office*